United States Patent
Chauveau

(10) Patent No.: US 11,472,573 B2
(45) Date of Patent: Oct. 18, 2022

(54) TOOL FOR HOLDING THE SIDE PANELS OF A PRIMARY STRUCTURE OF AN AIRCRAFT PYLON DURING ASSEMBLY THEREOF, AND METHOD FOR ASSEMBLING A PRIMARY STRUCTURE OF AN AIRCRAFT PYLON USING SAID HOLDING TOOL

(71) Applicant: Airbus Operations S.A.S., Toulouse (FR)

(72) Inventor: Marc Chauveau, Toulouse (FR)

(73) Assignee: Airbus Operations S.A.S.

( * ) Notice: Subject to any disclaimer, the term of this patent is extended or adjusted under 35 U.S.C. 154(b) by 186 days.

(21) Appl. No.: 16/832,114

(22) Filed: Mar. 27, 2020

(65) Prior Publication Data
US 2020/0324917 A1 Oct. 15, 2020

(30) Foreign Application Priority Data
Apr. 15, 2019 (FR) ..................................... 19 03982

(51) Int. Cl.
*B64F 5/10* (2017.01)
*B64D 27/26* (2006.01)

(52) U.S. Cl.
CPC ............... *B64F 5/10* (2017.01); *B64D 27/26* (2013.01); *B64D 2027/262* (2013.01)

(58) Field of Classification Search
CPC ...... B64F 5/10; B64D 27/26; B64D 2027/262
See application file for complete search history.

(56) References Cited

U.S. PATENT DOCUMENTS

| 9,604,319 | B2 * | 3/2017 | Anast ..................... B23K 26/28 |
| 2009/0283946 | A1 | 11/2009 | Cai et al. |
| 2011/0011972 | A1 | 1/2011 | Vache |
| 2015/0013142 | A1 | 1/2015 | West |

FOREIGN PATENT DOCUMENTS

| CA | 2717647 A1 | 10/2009 |
| EP | 2837567 A2 | 2/2015 |

OTHER PUBLICATIONS

Search Report including Written Opinion for FR1903982 dated Nov. 13, 2019.

* cited by examiner

*Primary Examiner* — Nirvana Deonauth
(74) *Attorney, Agent, or Firm* — Lerner, David, Littenberg, Krumholz & Mentlik, LLP

(57) ABSTRACT

A holding tool for holding the first and second side panels of a primary structure of an aircraft pylon during assembly thereof includes: a first portion configured to be removably secured to the first side panel, at least one second portion including at least one pair of first and second parts, positioned on either side of the second side panel and attracting one another by virtue of a magnetic field so as to secure the second portion to the second side panel, and at least one connection element connecting the first and second portions. Thus, during assembly of the primary structure, the second portion of the holding tool may be secured to the second side panel without the need for through-holes. The primary structure thus assembled does not comprise any through-holes in the side panels.

1 Claim, 4 Drawing Sheets

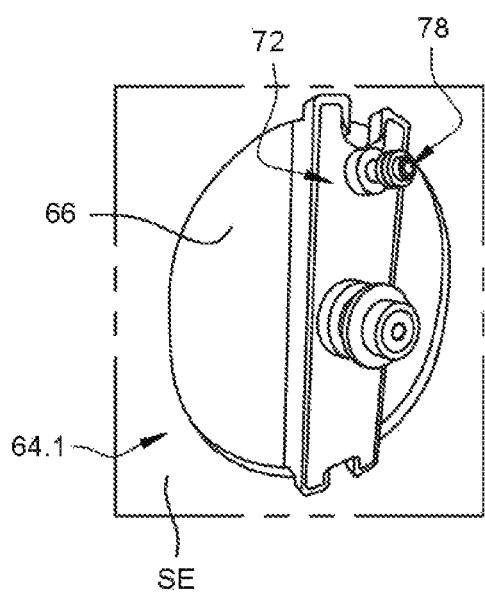
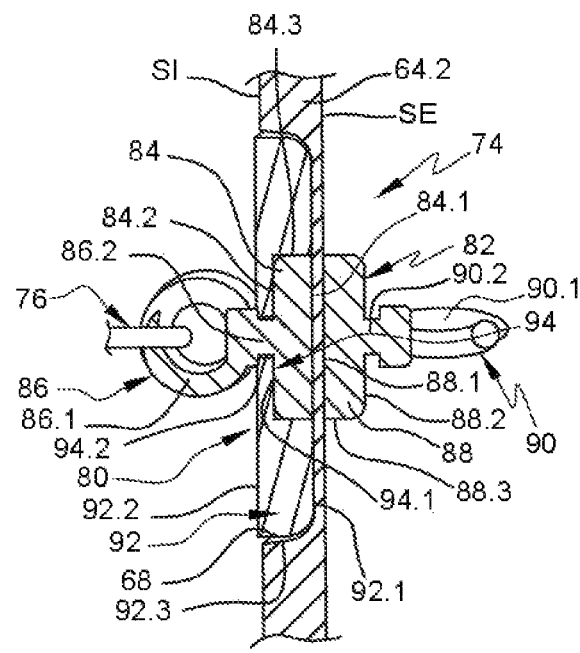
Fig. 8          Fig. 9
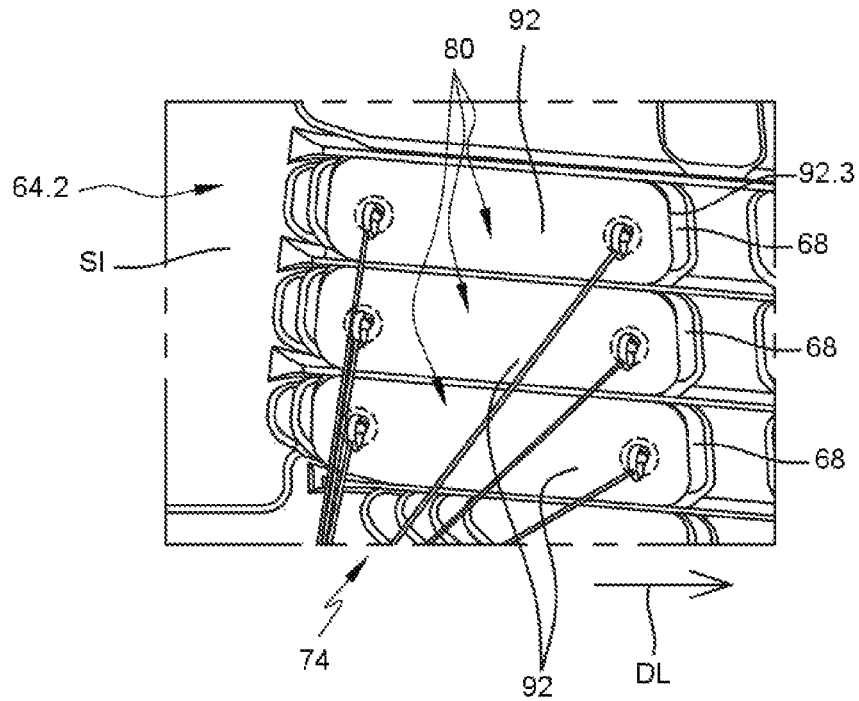
Fig. 10

TOOL FOR HOLDING THE SIDE PANELS OF A PRIMARY STRUCTURE OF AN AIRCRAFT PYLON DURING ASSEMBLY THEREOF, AND METHOD FOR ASSEMBLING A PRIMARY STRUCTURE OF AN AIRCRAFT PYLON USING SAID HOLDING TOOL

FIELD OF THE INVENTION

The present application relates to a tool for holding the side panels of a primary structure of an aircraft pylon during assembly thereof, to a method for assembling a primary structure of an aircraft pylon using said holding tool and to a primary structure of an aircraft pylon obtained by means of said method.

BACKGROUND OF THE INVENTION

According to one configuration shown in FIGS. 1 and 2, an aircraft 10 comprises a plurality of propeller assemblies 12 positioned under each of the wings 14 of the aircraft. Each propeller assembly 12 comprises an engine 16, a nacelle (not shown in FIG. 2) positioned around the engine 16, and a pylon 18 connecting the engine 16 and the wing 14. The pylon 18 comprises a primary structure 20 which is connected to the engine 16 by an engine attachment 22 and to the wing 14 by a wing attachment 24.

According to one configuration shown in FIG. 3, the primary structure 20 comprises:

upper and lower longerons 26, 28, transverse reinforcements 30 (also called ribs) connecting the upper and lower longerons 26, 28, which are arranged in transverse planes and which each have an approximately square or rectangular contour, a front end element 32 connecting a front end of the upper longeron 26 and a front end of the lower longeron 28, a rear end element 34 connecting a rear end of the upper longeron 26 and a rear end of the lower longeron 28, two side panels, one right-hand and one left-hand, 36, 38 arranged on either side of the transverse reinforcements 30.

The right-hand side panel 36 comprises at least one right-hand opening 36.1, 36.2 to allow access to the inside of the primary structure 20. The same applies to the left-hand side panel 38, which comprises at least one left-hand opening 38.1, 38.2. As the right-hand and left-hand side panels 36, 38 are not symmetrical, the right-hand openings 36.1, 36.2 in the right-hand side panel 36 are offset in a longitudinal direction with respect to the left-hand openings 38.1, 38.2 in the left-hand side panel 38.

During assembly of the primary structure 20, the right-hand and left-hand side panels 36, 38 and the upper and lower longerons 26, 28 are fastened to the set of transverse reinforcements 30.

According to one configuration, the assembly method comprises a step of drilling fastening holes in the longerons 26, 28 and the side panels 36, 38, a step of deburring the fastening holes in the longerons 26, 28 and in the side panels 36, 38, with these components not assembled, and a step of fitting the fasteners in the fastening holes in the longerons 26, 28, and lastly in the side panels 36, 38, with these components reassembled.

During the steps of drilling and of fitting the fasteners, the right-hand and left-hand side panels 36, 38 are held clamped against the set of transverse reinforcements 30 and against the longerons 26, 28 by means of tools 40 shown in FIG. 5.

Each tool 40 comprises:

a first portion 42 which comprises a head 42.1 positioned in an opening 36.1 in a first side panel 36, and a stem 42.2 having a first end connected to the head 42.1 and extending approximately perpendicularly to the first side panel 36 in the direction of the second side panel 38, a second portion 44 removably fastened to the second side panel 38, a connection system 46, of the twist-lock type for example, for connecting the second portion 44 and the second end of the stem 42.2.

According to one configuration, the head 42.1 comprises an expansion system 48 for blocking it in one of the openings 36.1, 36.2, 38.1, 38.2. The first portion 42 comprises an adjustment system 50 for adjusting the length of the stem 42.2.

The second portion 44 comprises a body 44.1 configured to receive the second end of the stem 42.2 of the first portion 42, a shaft 44.2 with a first end connected to the body 44.1, and a clamping system 44.3 configured to interact with the second end of the shaft 44.2 in such a way as to secure the second portion 44 on the second side panel 38.

To this end, the second panel 38 comprises, for each tool 40, a through-hole 52. In operation, the shaft 44.2 passes through the second panel 38 via one of the through-holes 52, the body 44.1 and the clamping system 44.3 of the second portion 44 of the tool 40 being arranged on either side of the second side panel 38 and connected by the shaft 44.2.

The through-holes 52 are provided exclusively for fastening the second portions 44 of the tools 40 and have no other function once the primary structure 20 has been assembled.

Making these through-holes 52 increases the production cost of the primary structure 20. This extra cost is all the greater with the through-holes 52 having to be made with high machining tolerances to avoid weakening the side panels 36, 38 in terms of fatigue strength, and/or with the through-holes 52 having to be plugged when they are positioned in areas exposed to aerodynamic flows.

BRIEF SUMMARY OF THE INVENTION

Aspects of the present invention may overcome some or all of the drawbacks of the prior art.

An aspect of the invention relates to a holding tool for holding the first and second side panels of a primary structure of an aircraft pylon, the first and second side panels comprising interior surfaces facing one another and exterior surfaces on the opposite side to the interior surfaces, the holding tool comprising a first portion configured to be removably secured to the first side panel, at least one second portion configured to be removably secured to the second side panel and at least one connection element connecting the first and second portions. According to an embodiment of the invention, the second portion comprises at least one pair of first and second parts, positioned on either side of the second side panel and attracting one another by virtue of a magnetic field, the first part being configured to be pressed against the interior surface of the second side panel, the second part being configured to be pressed against the exterior surface of the second side panel.

Thus, the second portion of the holding tool may be secured to the second side panel without the need for through-holes.

According to a further feature, at least one of the first and second parts comprises at least one permanent magnet.

According to a further feature, the second portion comprises a plurality of pairs of first and second parts and at least one holding plate configured to hold at least two first parts apart.

According to one embodiment, the first part comprises a first body in the form of a disc, having first and second parallel faces, and an attachment system for attaching a connection element, connected to the second face of the first body, the first face being configured to be pressed against the interior surface of the second side panel. In addition, the holding plate comprises, for each first part, a housing opening onto a first contact surface configured to be pressed against the interior surface of the second side panel, each housing being configured to immobilize the first body of the first part when it is inserted therein, the first face of the first body being flush with the first contact surface of the holding plate.

According to a further feature, each holding plate is configured to be positioned in a bowl shape made on the interior surface of the second side panel and having a perimeter, each holding plate comprising a peripheral edge substantially identical to the edge of the perimeter of the bowl shape.

According to a further feature, the second portion comprises a plurality of holding plates distributed in a first direction, each of the holding plates supporting a plurality of first parts distributed in a second direction approximately perpendicular to the first direction.

According to a further feature, for each first part of the second portion, the connection element comprises a cable which has a first end connected directly or indirectly to the first portion and a second end connected to the first part.

According to a further feature, the holding tool comprises an adjustment system for adjusting the tensions of the cables, which is borne by the first portion, the first ends of the various cables being connected to the adjustment system.

The invention also relates to a method for assembling a primary structure of an aircraft pylon comprising upper and lower longerons, first and second side panels and transverse reinforcements, the method comprising a step of fitting fasteners for connecting the longerons, the first and second side panels and the transverse reinforcements, in which step the first and second side panels are held clamped against the set of transverse reinforcements and, preferably, against the upper and lower longerons by means of at least one holding tool according to one of the above features.

The invention also relates to a primary structure of an aircraft pylon obtained by means of such an assembly method. Unlike in the prior art, the primary structure does not comprise any through-holes used for securing a tool for holding the side panels during assembly.

BRIEF DESCRIPTION OF THE DRAWINGS

Further features and advantages will become clear from the following description of the invention, which is provided purely by way of example, with reference to the attached drawings, in which:

FIG. 8 is a perspective view of a first portion of the holding tool shown in FIG. 7, positioned on a first side panel of a primary structure of an aircraft pylon, FIG. 9 is a view in section of a second portion of the holding tool shown in FIG. 7, positioned on a second side panel of a primary structure of an aircraft pylon, and FIG. 10 is a perspective view, from inside the primary structure, of a second portion of the holding tool shown in FIG. 7, positioned on a second side panel of a primary structure of an aircraft pylon.

DETAILED DESCRIPTION

Figure 1:
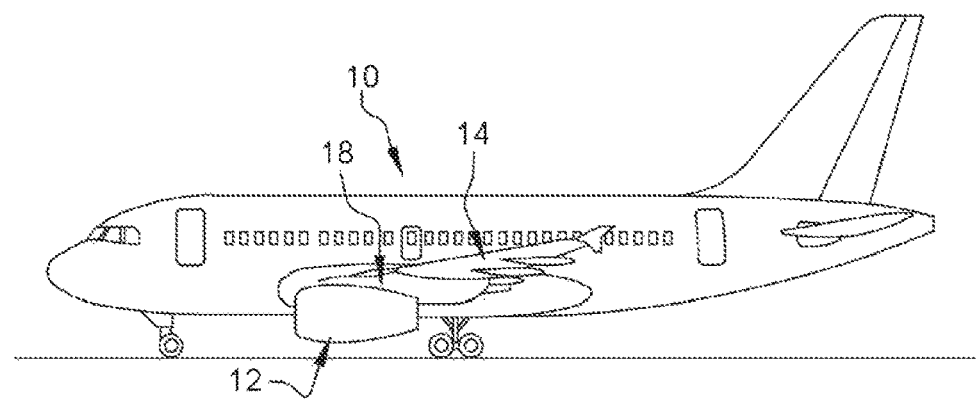
FIG. 1 is a side view of an aircraft.
Figure 2:
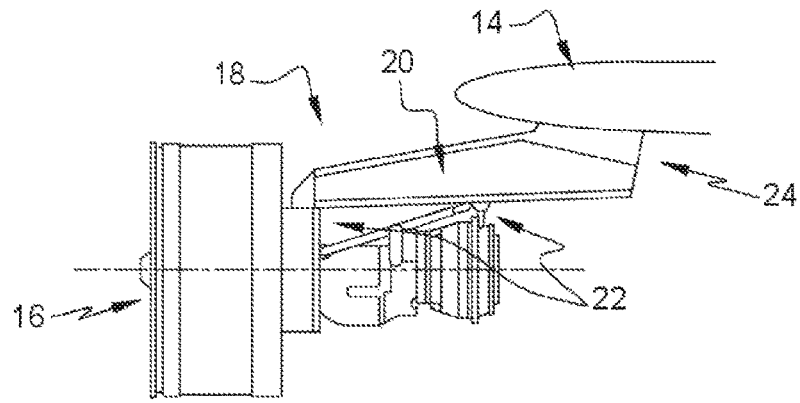
FIG. 2 is a schematic side representation of a propulsion assembly (the nacelle not being shown)
Figure 3:
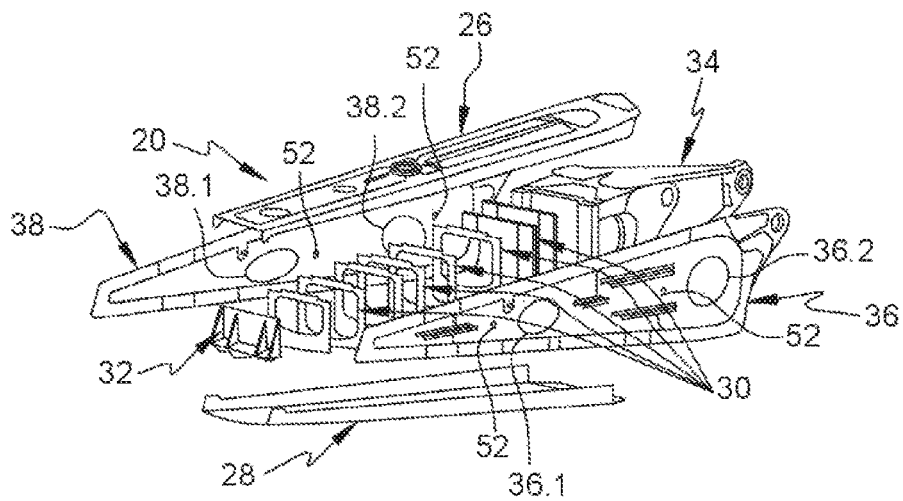
FIG. 3 is a perspective view of a primary structure of an aircraft pylon, before it is assembled, which shows an embodiment of the prior art.
Figure 4:
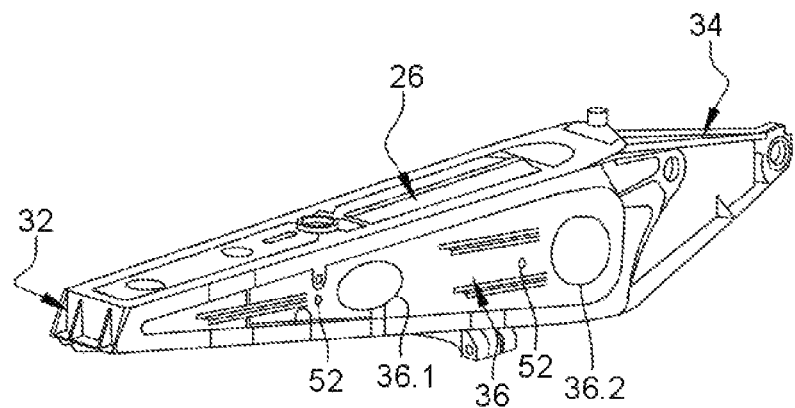
FIG. 4 is a perspective view of the primary structure shown in FIG. 3, after it has been assembled.
Figure 5:
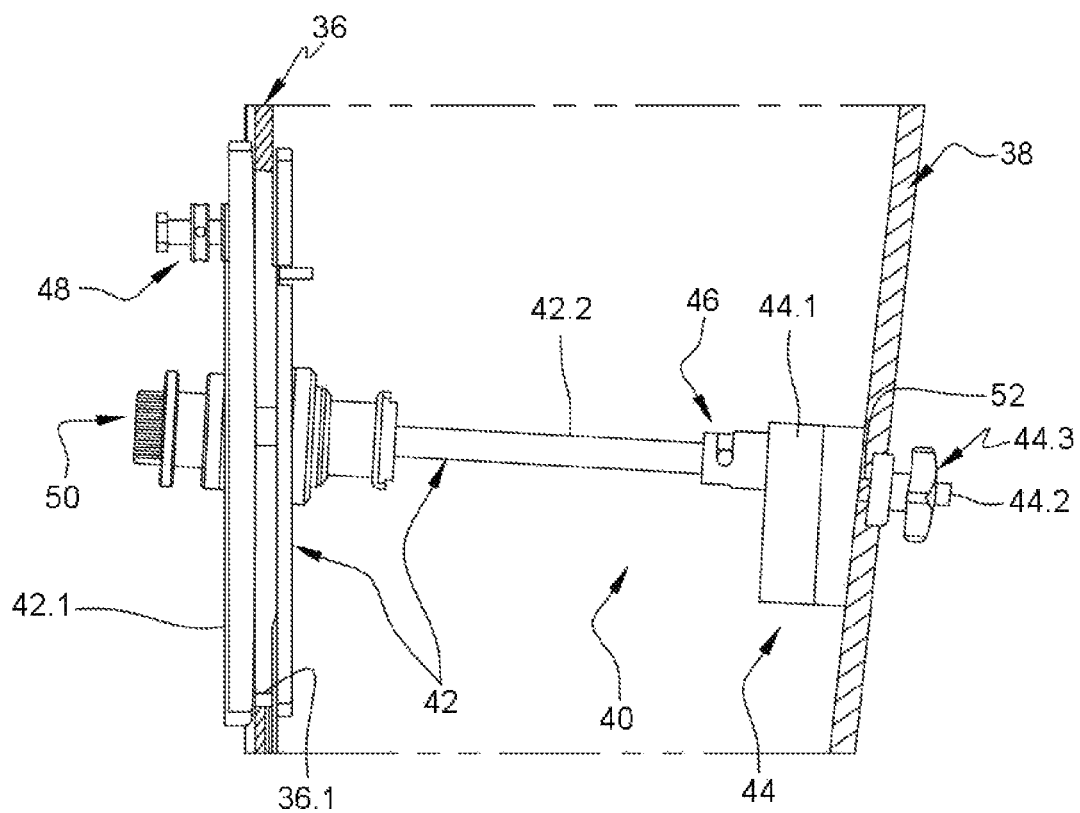
FIG. 5 is an end-on view of a holding tool connecting two side panels of a primary structure of an aircraft pylon, which shows an embodiment of the prior art.
Figure 6:
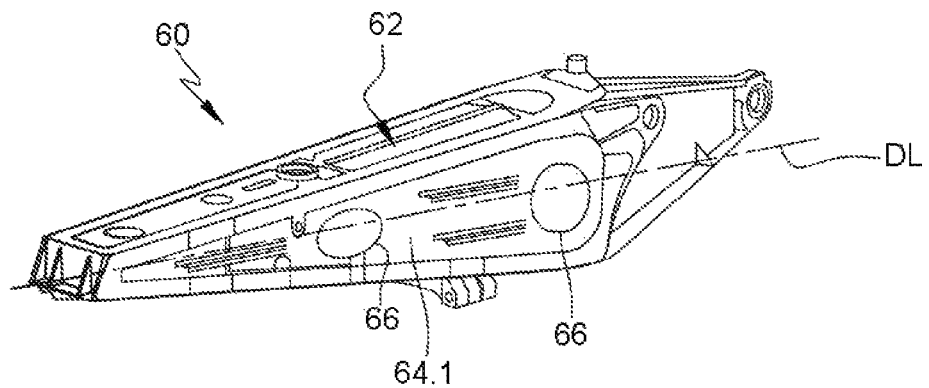
FIG. 6 is a perspective view of a primary structure of an aircraft pylon, which shows an embodiment of the invention.
Figure 7:
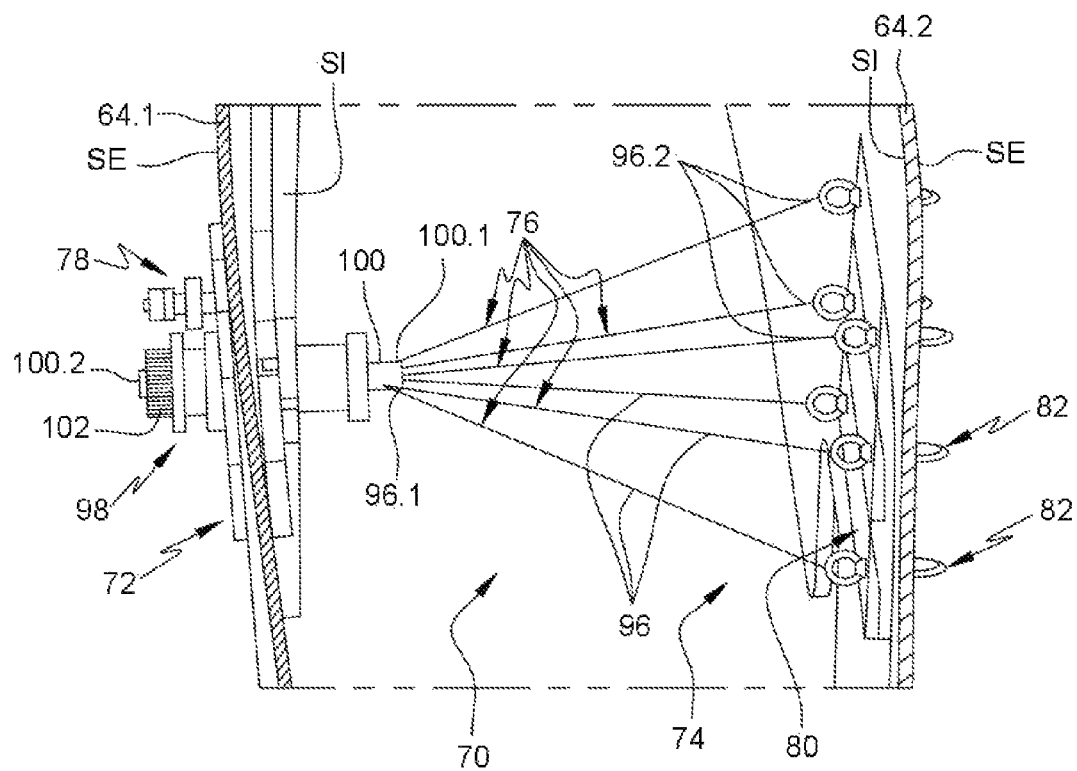
FIG. 7 is an end-on view of a holding tool connecting two side panels of a primary structure of an aircraft pylon, which shows an embodiment of the invention.

According to one embodiment shown in FIG. 6, a primary structure 60 of an aircraft pylon comprises upper and lower longerons 62, first and second side panels 64.1, 64.2 and transverse reinforcements (not shown) positioned in parallel transverse planes, having four sides against which the longerons 62 and the side panels 64.1, 64.2 bear. The primary structure 60 may comprise other elements, for example front and rear portions.

In the rest of the description, a longitudinal direction DL is perpendicular to the transverse planes in which the transverse reinforcements are positioned.

Each side panel 64.1, 64.2 comprises an interior surface SI oriented towards the inside of the primary structure 60 (facing one another) and an exterior surface SE oriented outwards from the primary structure 60, on the opposite side to the interior surface SI.

At least one of the side panels 64.1, 64.2 comprises at least one opening 66 passing through the side panel 64.1, 64.2. In general, each side panel 64.1, 64.2 comprises a plurality of openings 66. Each opening 66 in the first side panel 64.1 is offset in the longitudinal direction relative to the opening(s) in the second side panel 64.2.

According to one embodiment shown in FIGS. 9 and 10, each side panel 64.1, 64.2 has, on its interior surface, at least one bowl shape 68 (recessed shape) where the side panel 64.1, 64.2 has a reduced thickness. According to one configuration, the side panel 64.1, 64.2 comprises a plurality of bowl shapes 68, having a perimeter that is approximately rectangular with rounded corners, distributed over the height of the side panel (dimension considered in a transverse plane). By way of example, the side panel 64.1, 64.2 has a thickness of around 10 mm except at the bowl shapes 68 and a thickness of around 2 to 3 mm at the bowl shapes 68.

The side panels 64.1, 64.2 are made of a non-magnetic material, such as titanium or titanium alloy, for example.

The longerons 62, the transverse reinforcements and the side panels 64.1, 64.2 will not be described in more detail here, as they may be generally identical to those found in the prior art.

According to one mode of operation, the method for assembling the primary structure 60 comprises a step of drilling fastening holes in the longerons 62 and in the side panels 64.1, 64.2, a step of deburring the fastening holes in the longerons 62 and in the side panels 64.1, 64.2, with these components not assembled, and a step of fitting the fasteners in the fastening holes in the longerons 62 and in the side panels 64.1, 64.2, with these components reassembled.

During the steps of drilling and of fitting the fasteners, the first and second side panels 64.1, 64.2 are held clamped against the set of transverse reinforcements by means of at least one holding tool 70, shown in FIGS. 7 to 10.

Whatever the mode of operation, the method for assembling the primary structure 60 comprises a step of fitting fasteners for connecting the longerons 62, the first and second side panels 64.1, 64.2 and the transverse reinforcements, in which step the first and second side panels 64.1, 64.2 are held clamped against the set of transverse reinforcements by means of at least one holding tool 70.

In general, the first and second side panels 64.1, 64.2 are connected by a plurality of holding tools 70, distributed in the longitudinal direction, for example one holding tool 70 for each opening 66.

Each holding tool 70 comprises a first portion 72 configured to be removably secured to the first side panel 64.1, at least one second portion 74 configured to be removably secured to the second side panel 64.2 and at least one connection element 76 connecting the first and second portions 72, 74.

The first portion 72 is configured to be positioned in an opening 66 in the first side panel 64.1 and comprises an expansion system 78 for causing the first portion 72 to expand and be immobilized relative to the first side panel 64.1. This first portion 72 will not be described in more detail here, as it may be identical to that found in the prior art.

The second portion 74 comprises at least one pair of first and second parts 80, 82 positioned on either side of the second side panel 64.2 and attracting one another by virtue of a magnetic field, the first part 80 being configured to be pressed against the interior surface SI of the second side panel 64.2, the second part 82 being configured to be pressed against the exterior surface SE of the second side panel 64.2.

According to one embodiment, one of the first and second parts 80, 82 comprises at least one permanent magnet and the other of the first and second parts 80, 82 is made of a magnetic material, such as steel, for example.

According to another embodiment, the first and second parts 80, 82 each comprise a permanent magnet.

According to one configuration, the permanent magnets are neodymium magnets. This type of magnet makes it possible to resist a separation force of greater than or equal to 35 DaN.

According to one embodiment, the first part 80 comprises a first body 84 in the form of a disc which has first and second parallel faces 84.1, 84.2 connected by a cylindrical wall 84.3, the first face 84.1 being configured to be pressed against the interior surface SI of the second side panel 64.2. The first part 80 comprises, in addition to the first body, an attachment system 86 for attaching a connection element 76, connected to the second face 84.2 of the first body 84. According to one configuration, the attachment system 86 comprises a first ring 86.1 and a first stem 86.2 connecting the first ring 86.1 and the second face 84.2 of the first body 84. The first body 84 of the first part 80 is a permanent magnet or is made of a magnetic material.

According to one embodiment, the second part 82 comprises a second body 88 in the form of a disc which has first and second parallel faces 88.1, 88.2 connected by a cylindrical wall 88.3, the first face 88.1 being configured to be pressed against the exterior surface SE of the second side panel 64.2. The second part 82 comprises, in addition to the second body 88, a gripping system 90 so that it can be manipulated, which is connected to the second face 88.2 of the second body 88. According to one configuration, the gripping system 90 comprises a second ring 90.1 and a second stem 90.2 connecting the second ring 90.1 and the second face 88.2 of the second body 88. The second body 88 of the second part 82 is a permanent magnet or is made of a magnetic material.

According to a further feature, the second portion 74 comprises a plurality of pairs each comprising first and second parts 80, 82, positioned on either side of the second side panel 64.2, which attract one another by virtue of a magnetic field. The fact that there are a plurality of pairs of first and second parts 80, 82 makes it possible to distribute the loads over a larger surface area of the second side panel 64.2.

According to a further feature, the second portion 74 comprises at least one holding plate 92 configured to hold at least two first parts 80 apart.

According to one embodiment, each holding plate 92 comprises a first contact surface 92.1 configured to be pressed against the interior surface SI of the second side panel 64.2, a second surface 92.2 opposite to the first contact surface 92.1 (substantially parallel to the latter) and a peripheral edge 92.3 connecting the first contact surface 92.1 and the second surface 92.2.

The holding plate 92 comprises, for each first part 80, a housing 94 opening onto the first contact surface 92.1. This housing 94 has an end wall 94.1 at a distance from the second surface 92.2, the distance separating the end wall 94.1 and the first contact surface 92.1 being substantially equal to the thickness of the first body 84 of the first part 80 (distance separating the first and second faces 84.1, 84.2).

This housing 94 has a cylindrical shape having a diameter substantially equal to that of the first body 84 of the first part 80. The holding plate 92 comprises, for each housing 94, a through-aperture 94.2, connecting the housing 94 and the second surface 92.2, through which the first stem 86.2 passes. Thus, since each housing 94 is configured in such a way as to immobilize the first body 84 of the first part 80 when it is inserted therein, the first face 84.1 of the first body 84 is flush with the first contact surface 92.1 of the holding plate 92.

According to one configuration, each holding plate 92 is configured to be positioned in a bowl shape 68 made on the interior surface SI of the second side panel 64.2. In addition, each holding plate 92 has a peripheral edge 92.3 which is substantially identical to the edge of the perimeter of the bowl shape 68. Thus, the first parts 80 are immobilized relative to the second side panel 64.2 and cannot slide on the interior surface SI of the second side panel 64.2.

According to one embodiment, each holding plate 92 is made of plastic and produced by 3D printing, for example.

According to one configuration, the second portion 74 comprises a plurality of holding plates 92 distributed in a first direction and positioned in various bowl shapes 68 distributed over the height of the interior surface SI of the second side panel 64.2, each of the holding plates 92 supporting a plurality of first parts 80 distributed in a second direction approximately perpendicular to the first direction. According to one embodiment, the second portion 74 comprises three holding plates 92 each comprising two first parts 80 distributed in the longitudinal direction DL. This configuration allows less deformation of the second side panel 64.2.

According to a further feature, the tool 70 comprises, for each first part 80 of the second portion 74, a connection element 76 comprising a cable 96 which has a first end 96.1 connected directly or indirectly to the first portion 72 and a second end 96.2 connected to the first part 80.

According to a further feature, the tool 70 comprises an adjustment system 98 for adjusting a tension of the connection elements 76. According to one embodiment, for each first part 80 of the second portion 74, the second end 96.2 of the cable 96 is connected to the first ring 86.1.

The first ends 96.1 of the various cables 96 are connected to the adjustment system 98 borne by the first portion 72. According to one embodiment, the adjustment system 98 comprises a shaft 100 which has a first end 100.1 to which the various cables 96 are connected, and a second end 100.2 configured to be screwed into a knurled nut 102. Thus, a rotation of the knurled nut 102 causes a translational movement of the shaft 100, increasing or reducing the tension of the cables 96.

According to the invention, the second portion 74 of the tool 70 may be secured to the second side panel 64.2 without the need for through-holes 52. Thus, the primary structure does not comprise any through-holes 52 in the side panels. Doing away with the through-holes brings down the cost of manufacture of the primary structure.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assembling a primary structure of an aircraft pylon comprising upper and lower longerons, first and second side panels and transverse reinforcements, the method comprising:
fitting fasteners for connecting the longerons, the first and second side panels and the transverse reinforcements, wherein the first and second side panels are held clamped against the set of transverse reinforcements by at least one holding tool, the at least one holding tool comprising:
a first portion configured to be removably secured to the first side panel;
at least one second portion configured to be removably secured to the second side panel; and
at least one connection element connecting the first and at least one second portions,
wherein the at least one second portion comprises at least one pair of first and second parts, positioned on either side of the second side panel and attracting one another by virtue of a magnetic field,
wherein the first part is configured to be pressed against the interior surface of the second side panel, and
wherein the second part is configured to be pressed against the exterior surface of the second side panel;
the method further comprising removably securing a first portion of the tool to the first side panel and at least one second portion of the tool to the second side panel, at least one connection element of the tool connecting the first and second portions, wherein the second portion comprises at least one pair of first and second parts, wherein the first part is pressed against an interior surface of the second side panel, the second part is pressed against the exterior surface of the second side panel, and the first and second parts, positioned on either side of the second side panel, attract one another by virtue of a magnetic field.

\* \* \* \* \*